United States Patent
Chen

(10) Patent No.: US 10,650,782 B2
(45) Date of Patent: May 12, 2020

(54) METHOD AND DEVICE FOR ADJUSTING COLOR TEMPERATURE OF SCREEN, AND ELECTRONIC DEVICE

(71) Applicant: GUANGDONG OPPO MOBILE TELECOMMUNICATIONS CORP., LTD., Dongguan, Guangdong (CN)

(72) Inventor: Yongxing Chen, Guangdong (CN)

(73) Assignee: GUANGDONG OPPO MOBILE TELECOMMUNICATIONS CORP., LTD., Dongguan, Guangdong (CN)

(*) Notice: Subject to any disclaimer, the term of this patent is extended or adjusted under 35 U.S.C. 154(b) by 0 days.

(21) Appl. No.: 15/987,676

(22) Filed: May 23, 2018

(65) Prior Publication Data
US 2018/0366086 A1 Dec. 20, 2018

(30) Foreign Application Priority Data
Jun. 19, 2017 (CN) .......................... 2017 1 0465603

(51) Int. Cl.
*G09G 5/02* (2006.01)
*H04N 21/485* (2011.01)
(Continued)

(52) U.S. Cl.
CPC ............. *G09G 5/02* (2013.01); *G06F 16/437* (2019.01); *H04N 1/00* (2013.01);
(Continued)

(58) Field of Classification Search
CPC .......................... G09G 5/02; G09G 2320/0666
See application file for complete search history.

(56) References Cited

U.S. PATENT DOCUMENTS 5,351,079 A * 9/1994 Usui ..................... H04N 9/735
348/223.1
6,292,228 B1 9/2001 Cho
(Continued)

FOREIGN PATENT DOCUMENTS

CN 1241098 A 1/2000
CN 102606900 A 7/2012
(Continued)

OTHER PUBLICATIONS

Chinese Patent Application No. 201710465603.2, English translation of Office Action dated Feb. 27, 2019, 15 pages.
(Continued)

*Primary Examiner* — Todd Buttram
(74) *Attorney, Agent, or Firm* — Lathrop GPM LLP

(57) ABSTRACT

The present disclosure provides a method and a device for adjusting color temperature of a screen, and an electronic device. The method includes: obtaining multiple groups of adjustment parameters corresponding to multiple adjustment operations on initial color temperature of a screen; performing calculation on the multiple groups of adjustment parameters according to a preset algorithm, to obtain an average color temperature difference; and calculating preference color temperature based on the initial color temperature and the average color temperature difference to obtain, and setting the color temperature of the screen of the user according to the preference color temperature.

10 Claims, 5 Drawing Sheets multiple groups of adjustment parameters corresponding to multiple adjustment operations on initial color temperature of a screen are obtained — 101 calculation is performed on the multiple groups of adjustment parameters according to a preset algorithm, to obtain an average color temperature difference — 102 preference color temperature is calculated based on the initial color temperature and the average color temperature difference, and the color temperature of the screen of the user is set according to the preference color temperature — 103

(51) Int. Cl.
*H04N 1/00* (2006.01)
*G06F 16/435* (2019.01)

(52) U.S. Cl.
CPC . *H04N 21/4854* (2013.01); *G09G 2320/0666* (2013.01); *G09G 2320/08* (2013.01); *G09G 2354/00* (2013.01); *G09G 2360/144* (2013.01)

(56) References Cited

U.S. PATENT DOCUMENTS

| | | | |
|---|---|---|---|
| 7,417,671 | B2 | 8/2008 | Sugimori |
| 2009/0295938 | A1* | 12/2009 | Nikkanen ............... H04N 9/735 348/223.1 |
| 2011/0095875 | A1 | 4/2011 | Thyssen et al. |
| 2014/0285477 | A1* | 9/2014 | Cho ..................... G09G 3/2003 345/207 |
| 2015/0116534 | A1* | 4/2015 | Kim ..................... H04N 1/6027 348/223.1 |
| 2017/0078636 | A1* | 3/2017 | Cho ..................... H04N 1/6027 |
| 2018/0096460 | A1* | 4/2018 | Tripp ................... G06F 1/1684 |
| 2018/0182161 | A1* | 6/2018 | Chaudhari ............ G06T 11/001 |

FOREIGN PATENT DOCUMENTS

| | | | |
|---|---|---|---|
| CN | 202662673 | U | 1/2013 |
| CN | 104168468 | A | 11/2014 |
| CN | 105957498 | A | 9/2016 |
| CN | 106097953 | A * | 11/2016 |
| CN | 106097953 | A | 11/2016 |
| CN | 2016-716045 | * | 12/2016 |
| CN | 106250012 | A | 12/2016 |
| CN | 106535120 | A | 3/2017 |
| CN | 106791164 | A | 5/2017 |
| CN | 107301027 | A | 10/2017 |
| EP | 1259098 | A1 | 11/2002 |
| KR | 20050023748 | A | 3/2005 |

OTHER PUBLICATIONS

Chinese Patent Application No. 201710465603.2, Office Action dated Feb. 27, 2019, 12 pages.
PCT/CN2018/087450 English Translation of the International Search Report and Written Opinion dated Jul. 27, 2018, 10 pp.
European Patent Application No. 18173600.0, Extended Search and Opinion dated Sep. 28, 2018, 12 pages.

* cited by examiner

```
┌─────────────────────────────────────────────────┐
│ multiple groups of adjustment parameters         │      101
│ corresponding to multiple adjustment operations  │
│ on initial color temperature of a screen are     │
│ obtained                                         │
└─────────────────────────────────────────────────┘
                        │
                        ▼
┌─────────────────────────────────────────────────┐
│ calculation is performed on the multiple groups │      102
│ of adjustment parameters according to a preset  │
│ algorithm, to obtain an average color           │
│ temperature difference                           │
└─────────────────────────────────────────────────┘
                        │
                        ▼
┌─────────────────────────────────────────────────┐
│ preference color temperature is calculated       │      103
│ based on the initial color temperature and the   │
│ average color temperature difference, and the    │
│ color temperature of the screen of the user is   │
│ set according to the preference color            │
│ temperature                                      │
└─────────────────────────────────────────────────┘
```

Fig. 1 ically, to a method and a
device for adjusting color temperature of a screen, and an
electronic device.

METHOD AND DEVICE FOR ADJUSTING COLOR TEMPERATURE OF SCREEN, AND ELECTRONIC DEVICE

FIELD

The present disclosure relates to a field of screen display technologies, and more particularly, to a method and a device for adjusting color temperature of a screen, and an electronic device.

BACKGROUND

At present, a screen of an electronic device presents different colors mainly by mixing three colors of RGB. B represents high-energy short-wavelength blue light, and too much blue light will cause eye diseases, such as maculopathy. Therefore, many manufacturers adopt ways to filter part of the blue light to protect users' eye health.

However, when part of the blue light B is filtered, there may be a need to improve adjusting color temperature of the screen.

SUMMARY

Embodiments of a first aspect of the present disclosure provide a method for adjusting color temperature of a screen. The method includes: obtaining multiple groups of adjustment parameters corresponding to multiple adjustment operations on initial color temperature of a screen; performing calculation on the multiple groups of adjustment parameters according to a preset algorithm, to obtain an average color temperature difference; and calculating preference color temperature based on the initial color temperature and the average color temperature difference, and setting the color temperature of the screen of the user according to the preference color temperature.

Embodiments of a second aspect of the present disclosure provide a device for adjusting color temperature of a screen. The device includes a non-transitory computer-readable medium comprising computer-executable instructions stored thereon and an instruction execution system which is configured by the instructions to implement at least one of: a first obtaining module, configured to obtain multiple groups of adjustment parameters corresponding to multiple adjustment operations on initial color temperature of a screen; a second obtaining module, configured to perform calculation on the multiple groups of adjustment parameters according to a preset algorithm, to obtain an average color temperature difference; and a calculating module, configured to calculate preference color temperature based on the initial color temperature and the average color temperature difference; and a setting module, configured to set the color temperature of the screen of the user according to the preference color temperature.

Embodiments of a third aspect of the present disclosure provide an electronic device. The electronic device includes a housing, a processor, a memory, a circuit board, a power supply circuit and a screen. The circuit board is arranged inside a space enclosed by the housing. The processor and the memory are disposed on the circuit board. The power supply circuit is configured to provide power for respective circuits or components of the electronic device. The memory is configured to store executable program codes. The processor is configured to run a program corresponding to the executable program codes by reading the executable program codes stored in the memory, to perform the method for adjusting color temperature of a screen according to embodiments of the first aspect of the present disclosure.

Embodiments of a fourth aspect of the present disclosure provide a non-transitory computer-readable storage medium. The storage medium is stored thereon with a computer program. When the program is executed by a processor, the method for adjusting color temperature of a screen described in embodiments of the first aspect of the present disclosure is implemented.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which:

FIG. 1 is a flow chart of a method for adjusting color temperature of a screen according to an embodiment of the present disclosure;

DETAILED DESCRIPTION

Figure 2:
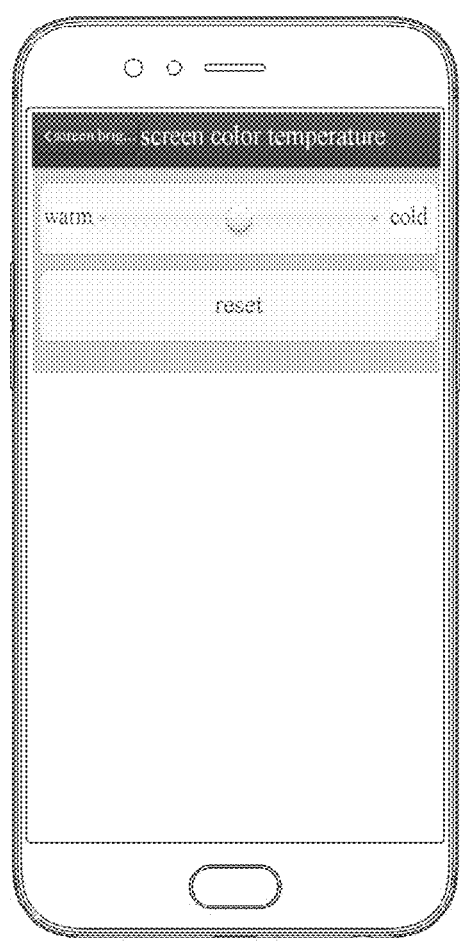
FIG. 2 is a schematic diagram of adjusting color temperature of a screen according to an embodiment of the present disclosure.

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described below with reference to the drawings are exemplary, and are intended to explain the present disclosure, and should not be construed to limit the present disclosure.

The method for setting color temperature of a screen in the related art may calculate target color temperature merely based on parameters such as current ambient color temperature, illumination, and time. However, in actual life, users' perception and preferences for the color temperature of the screen may be different. Therefore, the color temperature of the screen calculated based on objective ambient factors cannot satisfy personalized needs of users, for example, some users may feel that the adjusted color temperature of the screen is relatively warm, and some other users may feel that the adjusted color temperature of the screen is relatively cold.

For this, embodiments of the present disclosure provide a method for adjusting color temperature of a screen. The method includes: obtaining multiple groups of adjustment parameters corresponding to multiple adjustment operations on initial color temperature of a screen; performing calculation on the multiple groups of adjustment parameters according to a preset algorithm, to obtain an average color temperature difference; and calculating preference color temperature based on the initial color temperature and the average color temperature difference, and setting the color temperature of the screen according to the preference color temperature.

In the following, the method for adjusting color temperature of a screen provided by the present disclosure will be described with reference to drawings.

FIG. 1 is a flow chart of a method for adjusting color temperature of a screen according to an embodiment of the present disclosure.

As illustrated in FIG. 1, the method may include the following.

At block 101, multiple groups of adjustment parameters corresponding to multiple adjustment operations on initial color temperature of a screen are obtained.

The initial color temperature of the screen may be default color temperature calculated by the system based on ambient parameters such as ambient color temperature, illumination, and time.

In addition, the above adjustment parameter may correspond to a color temperature value. For example, an adjustment parameter 1 may correspond to a color temperature value A, an adjustment parameter 2 may correspond to a color temperature value B, etc. In an actual implementation process, the adjustment parameter may be a position of a seekbar, or may be an input color temperature value, etc. The expression form of the adjustment parameter depends on the color temperature adjustment manner provided by the system.

At block 102, calculation is performed on the multiple groups of adjustment parameters according to a preset algorithm, to obtain an average color temperature difference.

It should be understood that, in the actual implementation process, a color temperature adjustment function is provided for changing the color temperature, and the user can adjust the color temperature of the screen through the color temperature adjustment function. For example, as illustrated in FIG. 2, the user is provided with a seekbar to adjust the color temperature in the mobile phone. When the user is not satisfied with current color temperature of the screen, the user can drag the seekbar to his/her desired position.

Thus, the user's adjustment on the initial color temperature of the screen is based on his/her personal preference. Therefore, by obtaining the multiple groups of adjustment parameters corresponding to the user's multiple operations on the initial color temperature of the screen, a general preference color temperature of the user can be analyzed.

Furthermore, in order to specifically know the difference between the user's preference color temperature and the initial color temperature, calculation can be performed on the multiple groups of adjustment parameters according to the preset algorithm to obtain the average color temperature difference. The average color temperature difference is obtained by learning the multiple groups of adjustment parameters implemented by the user, and thus conforms to a degree of the user's preference color temperature. Moreover, the average color temperature difference can balance randomness of each color temperature adjustment. For example, the user adjusts the initial color temperature of the screen five times, and differences between the adjusted color temperature and corresponding initial color temperature of the screen are 20K, 100K, 120K, 120K, and 300K, respectively, and then by calculating the average color temperature difference from the multiple groups of adjustment parameters, the deviation brought by 20K and 300K can be reduced, such that the average color temperature difference may be more conforming to the user's actual preference color temperature.

It should be noted that, based on different application scenarios, different ways may be adopted to obtain the multiple groups of adjustment parameters corresponding to the user's multiple adjustment operations on the initial color temperature of the screen. Examples are as follows.

Example One

Target color temperature corresponding to each adjustment operation on the initial color temperature of the screen is obtained, and a first color temperature difference of the target color temperature minus the initial color temperature is calculated, and then multiple first color temperature differences corresponding to the multiple adjustment operations on the initial color temperature of the screen are averaged to obtain the average color temperature difference.

For example, the system calculates that the initial color temperature is 200K according to ambient parameters in a scenario 1, in this case, when the user drags the color temperature bar to a color temperature of 280K, it is determined that user's preference is relatively cold color temperature and it needs to be colder by about 80K; the system calculates that the initial color temperature is 300K according to the ambient parameters in the scenario 1, in this case, when the user drags the color temperature bar to a color temperature of 360K, it is determined that the user's preference is relatively cold color temperature and it needs to be colder by about 60K. Then, by averaging the two color temperature differences, it can be known that the average color temperature difference is 70K.

Certainly, in this example, for convenience of description, only two groups of adjustment parameters are taken as an example for illustration. In a practical application, the more the number of the groups of adjustment parameter is, the more the calculated average color temperature is conforming to the user's personal preference color temperature.

Example Two

Target color temperature and adjustment ambient parameters corresponding to each adjustment operation on the initial color temperature of the screen are obtained, and a first color temperature difference of the target color temperature minus the initial color temperature is calculated. In this example, the influence of the adjustment ambient parameters on the color temperature is considered, and the first color temperature difference is not simply determined by numerical difference between the target color temperature and the initial color temperature.

The adjustment ambient parameters include one or a combination of ambient color temperature, illumination, and time.

Further, calculation is performed on the first color temperature difference and the adjustment ambient parameters of each color temperature adjustment according to a preset neural network algorithm to obtain a second color temperature difference of each color temperature adjustment, and multiple second color temperature differences corresponding to the multiple adjustment operations on the initial color temperature of the screen are averaged to obtain the average color temperature difference.

In detail, weights corresponding to different adjustment ambient parameters can be obtained according to different influences of different adjustment ambient parameters on the color temperature, and then calculation can be performed on the first color temperature difference, the adjustment ambient parameters and the corresponding weights of each color temperature adjustment according to the preset neural network algorithm to obtain the second color temperature difference of each color temperature adjustment.

At block 103, preference color temperature is calculated based on the initial color temperature and the average color temperature difference, and the color temperature of the screen of the user is set according to the preference color temperature.

In detail, after the average color temperature difference representing the degree of the user's preference color temperature is obtained, a sum of the initial color temperature and the average color temperature difference is calculated to obtain the user's preference color temperature, and the color temperature of the screen of the user is set according to the preference color temperature and based on the initial color temperature.

According to composition principle of color in the color temperature, the greater the value of the color temperature is, the colder the color temperature is, and the smaller the value of the color temperature is, the warmer the color temperature is. Therefore, when it is calculated that the average color temperature difference is positive, it indicates that the user's preference color temperature is relatively cold, and thus the average color temperature difference can be added to the initial color temperature to obtain the current screen color temperature, and when it is calculated that the average color temperature difference is negative, it indicates that the user's preference color temperature is relatively warm, and thus the average color temperature difference can be added on the basis of the initial color temperature.

It should be noted that, the method for adjusting color temperature of a screen according to embodiments of the present disclosure may be a continuous learning and optimization process. When the color temperature of the screen matched according to a previous learning result is displayed to the user, the user may be not satisfied with the color temperature of the screen set according to his/her previous preference color temperature in some scenarios, since the user's preference or vision may change. In this case, adjustment parameters of the user's adjustment operation on the color temperature of the screen based on the current color temperature of the screen can be recorded, and the adjustment parameters of this adjustment operation can be added to the learning process, such that the color temperature of the screen can vary with the change of the user's preference color temperature. In this case, the initial color temperature provided in this scenario is the color temperature of the screen matched according to a previous learning result.

In order to enable those skilled in the art to more clearly understand the present disclosure, an actual implementation process of the method for adjusting color temperature of a screen according to the present disclosure is now described with reference to a specific application scenario.

Figure 3:
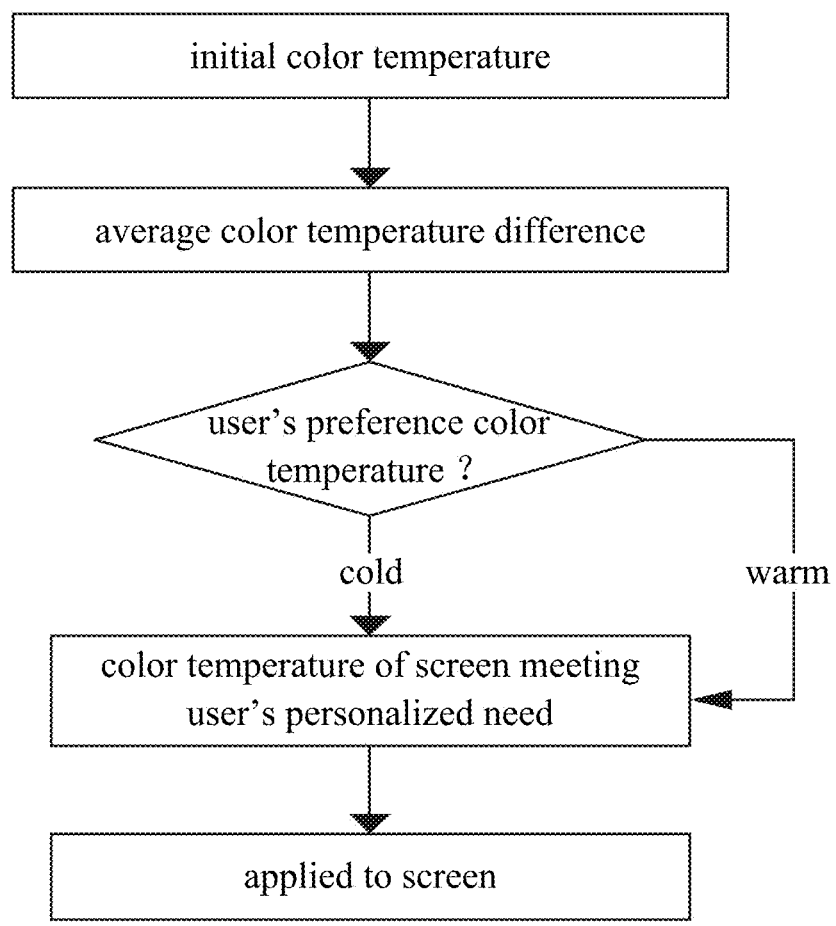
FIG. 3 is a flow chart of a method for adjusting color temperature of a screen according to an embodiment of the present disclosure.

As illustrated in FIG. 3, the initial color temperature of the screen is recorded, the color temperature, the ambient color temperature, the illumination and the time when the user repeatedly drags to set the color temperature are recorded, the target color temperature and the adjustment ambient parameters corresponding to the user's each adjustment operation on the initial color temperature of the screen are obtained, the first color temperature difference between the target color temperature and the initial color temperature is calculated, calculation is performed on the first color temperature difference and the adjustment ambient parameters of each color temperature adjustment according to a preset neural network algorithm to obtain the second color temperature difference of each color temperature adjustment, and the multiple second color temperature differences corresponding to the multiple adjustment operations on the initial color temperature of the screen are averaged to obtain the average color temperature difference $\Delta K=f(cct, lux, t, \delta K)$, where $\delta K$ is the second color temperature difference, cct is the ambient color temperature, lux is the illumination, and t is time.

When the average color temperature difference is positive, it indicates that the preference color temperature is relatively cold, and when the average color temperature is negative, it indicates that the preference color temperature is relatively warm. When it is warm, the color temperature of the screen is $CT=ct-|\Delta K|$ (ct is the initial color temperature), and when it is cold, the color temperature of the screen is $CT=ct+|\Delta K|$.

Based on the above embodiments, it should be understood that, during actual operations, the multiple groups of adjustment parameters may not be implemented by the same user, but may be implemented by multiple users when they use separately. Therefore, in order to more accurately match the color temperature of the screen according to the user's personal preference, the method for adjusting the color temperature of the screen according to the present disclosure may be separately implemented for different users.

As a possible implementation, identity authentication information can be collected each time when the electronic device is used. For example, each time when the user uses the electronic device, the user needs to enter fingerprint information for authentication. When the electronic device is unlocked based on the corresponding fingerprint information, multiple groups of adjustment parameters corresponding to the user's multiple adjustment operations on the initial color temperature of the screen can be recorded and learned to obtain the color temperature of the screen corresponding to the user corresponding to the fingerprint information. When the user uses the fingerprint information to unlock the electronic device, the preference color temperature corresponding to the fingerprint information is retrieved, and the color temperature of the screen is set according to the preference color temperature.

In conclusion, with the method for adjusting color temperature of a screen according to embodiments of the present disclosure, the multiple groups of adjustment parameters corresponding to the user's multiple adjustment operations on the initial color temperature of the screen are obtained, calculation is performed on the multiple groups of adjustment parameters according to the preset algorithm to obtain the average color temperature difference, the difference between the initial color temperature and the average color temperature difference is calculated to obtain the user's preference color temperature, and the color temperature of the screen of the user is set according to the preference color temperature. Thus, the initial color temperature is adjusted according to the user's preference color temperature, such that the user's personalized visual need is satisfied, and user experience is improved.

In order to achieve the above objectives, the present disclosure also provides a device for adjusting color temperature of a screen.

Figure 4:
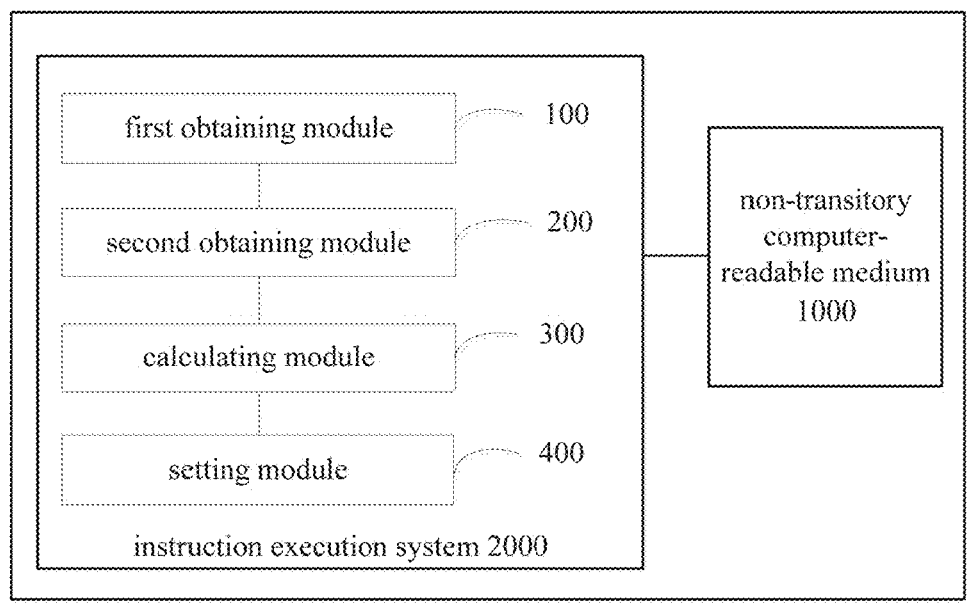
FIG. 4 is a block diagram of a device for adjusting color temperature of a screen according to an embodiment of the present disclosure.

FIG. 4 is a block diagram of a device for adjusting color temperature of a screen according to an embodiment of the present disclosure.

As illustrated in FIG. 4, the device includes a non-transitory computer-readable medium 1000 including computer-executable instructions stored thereon and an instruction execution system 2000 which is configured by the instructions to implement at least one of a first obtaining module 100, a second obtaining module 200, a calculating module 300 and a setting module 400.

The first obtaining module 100 is configured to obtain multiple groups of adjustment parameters corresponding to multiple adjustment operations on initial color temperature of the screen.

The second obtaining module 200 is configured to calculate the multiple groups of adjustment parameters according to a preset algorithm, to obtain an average color temperature difference.

The calculating module 300 is configured to calculate preference color temperature based on the initial color temperature and the average color temperature.

The setting module is configured to set the color temperature of the screen according to the preference color temperature.

Figure 5:
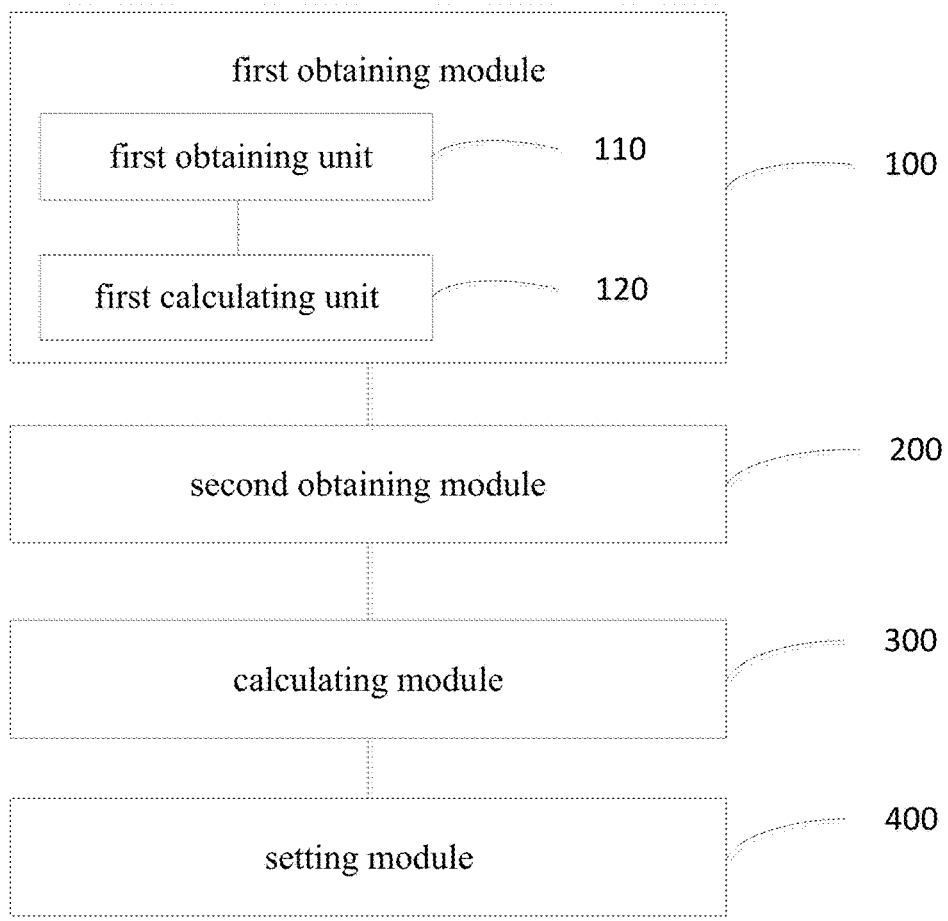
FIG. 5 is a block diagram of a device for adjusting color temperature of a screen according to another embodiment of the present disclosure.

In an embodiment of the present disclosure, as illustrated in FIG. 5, and on the basis of FIG. 4, the first obtaining module 100 includes a first obtaining unit 110 and a first calculating unit 120.

The first obtaining unit 110 is configured to obtain target color temperature corresponding to each adjustment operation on the initial color temperature of the screen.

The first calculating unit 120 is configured to calculate a first color temperature difference between the target color temperature and the initial color temperature.

In an embodiment, the second obtaining module 200 is configured to average multiple first color temperature differences corresponding to the multiple adjustment operations on the initial color temperature of the screen, to obtain the average color temperature difference.

Figure 6:
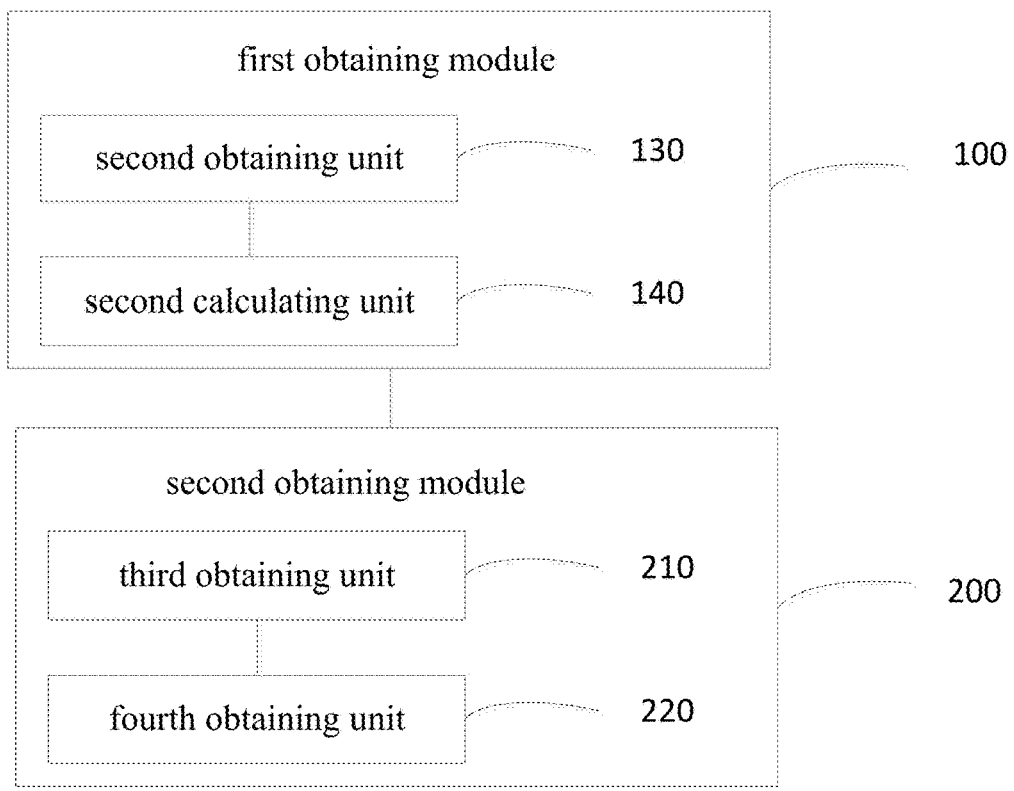
FIG. 6 is a block diagram of a device for adjusting color temperature of a screen according to yet another embodiment of the present disclosure.

In an embodiment of the present disclosure, as illustrated in FIG. 6, and on the basis of the FIG. 4, the first obtaining module 100 includes a second obtaining unit 130 and a second calculating unit 140. The second obtaining module 200 includes a third obtaining module 210 and a fourth obtaining module 220.

The second obtaining unit 130 is configured to obtain target color temperature and adjustment ambient parameters corresponding to each adjustment operation on the initial color temperature of the screen.

The second calculating unit 140 is configured to calculate the first color temperature difference between the target color temperature and the initial color temperature.

The third obtaining unit 210 is configured to perform calculation on the first color temperature difference and the adjustment ambient parameters of each color temperature adjustment according to a preset neural network algorithm, to obtain a second color temperature difference of each color temperature adjustment.

The fourth obtaining unit 220 is configured to average multiple second color temperature differences corresponding to the multiple adjustment operations on the initial color temperature of the screen, to obtain the average color temperature difference.

It should be noted that, the foregoing description of the method for adjusting color temperature of a screen is also applicable to the device for adjusting color temperature of a screen according to embodiments of the present disclosure, implementation principle thereof is similar, and details are not described herein again.

In conclusion, with the device for adjusting color temperature of a screen according to embodiments of the present disclosure, the multiple groups of adjustment parameters corresponding to the user's multiple adjustment operations on the initial color temperature of the screen are obtained, calculation is performed on the multiple groups of adjustment parameters according to the preset algorithm to obtain the average color temperature difference, the difference between the initial color temperature and the average color temperature difference is calculated to obtain the user's preference color temperature, and the color temperature of the screen of the user is set according to the preference color temperature. Thus, the initial color temperature is adjusted according to the user's preference color temperature, such that the user's personalized visual need is satisfied, and user experience is improved.

Figure 7:
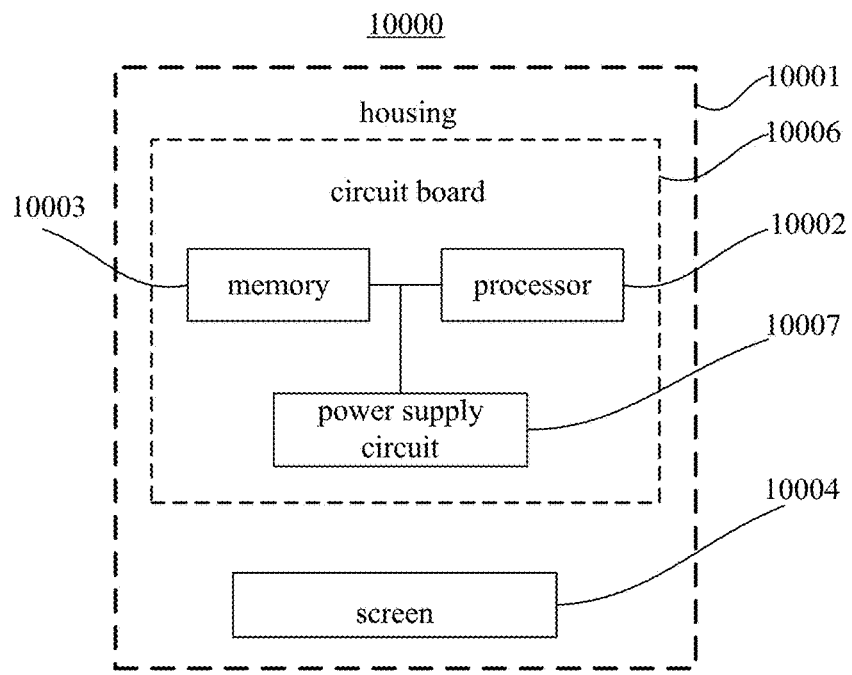
FIG. 7 is a block diagram of an electronic device according to an embodiment of the present disclosure.

In order to achieve the above embodiments, the present disclosure also provides an electronic device. FIG. 7 is a block diagram of an electronic device according to an embodiment of the present disclosure. As illustrated in FIG. 7, the electronic device 10000 may include a housing 10001, a processor 10002, a memory 10003, a circuit board 10006, a power supply circuit 10007 and a screen 10004. The circuit board 10006 is enclosed by the housing 10001. The processor 10002 and the memory 10003 are positioned on the circuit board 10006. The power supply circuit 10007 is configured to provide power for respective circuits or components of the electronic device 10000. The memory 10003 is configured to store executable program codes. The processor 10002 is configured to run a program corresponding to the executable program codes by reading the executable program codes stored in the memory, to perform the method for adjusting color temperature of the screen 10004 according to above embodiments.

In some implementations, the electronic device may be a mobile phone or a tablet computer, which is not limited therein.

The electronic device 10000 may further include an inputting component (not illustrated in FIG. 7). It should be understood that, the inputting component may further include one or more of the following: an inputting interface, a physical button of the electronic device 10000, a microphone, etc.

It should be understood that, the electronic device 10000 may further include one or more of the following components (not illustrated in FIG. 7): an audio component, an input/output (I/O) interface, a sensor component and a communication component. The audio component is configured to output and/or input audio signals, for example, the audio component includes a microphone. The I/O interface is configured to provide an interface between the processor 10002 and peripheral interface modules. The sensor component includes one or more sensors to provide status assessments of various aspects of the electronic device 10000. The communication component is configured to facilitate communication, wired or wirelessly, between the electronic device 10000 and other devices.

In conclusion, with the electronic device according to embodiments of the present disclosure, the multiple groups of adjustment parameters corresponding to the user's multiple adjustment operations on the initial color temperature of the screen are obtained, calculation is performed on the multiple groups of adjustment parameters according to the preset algorithm to obtain the average color temperature difference, the difference between the initial color temperature and the average color temperature difference is calculated to obtain the user's preference color temperature, and the color temperature of the screen of the user is set according to the preference color temperature. Thus, the initial color temperature is adjusted according to the user's preference color temperature, such that the user's personalized visual need is satisfied, and user experience is improved.

In order to achieve the above embodiments, the present disclosure also provides a non-transitory computer-readable storage medium. The storage medium is configured to be stored with a computer program thereon. When the program is executed by a processor, the method for adjusting color temperature of a screen described in any one of the above embodiments of the present disclosure is implemented.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the above phrases in various places throughout this specification are not necessarily referring to the same embodiment or example of the present disclosure. Furthermore, the particular features, structures, materials, or characteristics may be combined in any suitable manner in one or more embodiments or examples.

In addition, terms such as "first" and "second" are used herein for purposes of description and are not intended to indicate or imply relative importance or significance. Thus, the feature defined with "first" and "second" may comprise one or more this feature. In the description of the present disclosure, unless specified otherwise, "multiple" means at least two, for example, two or three.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc. Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A method for adjusting color temperature of a screen, comprising:
   obtaining multiple groups of adjustment parameters corresponding to multiple adjustment operations on initial color temperature of a screen, comprising: obtaining target color temperature and adjustment ambient parameters corresponding to each adjustment operation on the initial color temperature of the screen, and calculating a first color temperature difference of the target color temperature minus the initial color temperature;
   performing calculation on the multiple groups of adjustment parameters according to a preset algorithm, to obtain an average color temperature difference, comprising: performing calculation on the first color temperature difference and the adjustment ambient parameters of each color temperature adjustment according to a preset neural network algorithm, to obtain a second color temperature difference of each color temperature adjustment and averaging multiple second color temperature differences corresponding to the multiple adjustment operations on the initial color temperature of the screen, to obtain the average color temperature difference; and calculating preference color temperature based on the initial color temperature and the average color temperature difference, and setting the color temperature of the screen according to the preference color temperature;

wherein the adjustment ambient parameters comprise a combination of ambient color temperature, illumination, and time, and before obtaining the second color temperature difference of each color temperature adjustment, the method further comprises:

obtaining weights corresponding to different adjustment ambient parameters, and performing calculation on the first color temperature difference, the adjustment ambient parameters and corresponding weights of each color temperature adjustment according to the preset neural network algorithm, to obtain the second color temperature difference of each color temperature adjustment.

2. The method according to claim 1, wherein performing calculation on the multiple groups of adjustment parameters according to the preset algorithm to obtain the average color temperature difference comprises:

averaging multiple first color temperature differences corresponding to the multiple adjustment operations on the initial color temperature of the screen, to obtain the average color temperature difference.

3. The method according to claim 1, wherein determining preference color temperature based on the initial color temperature and the average color temperature difference comprises:

adding the average color temperature difference to the initial color temperature to obtain the preference color temperature.

4. The method according to claim 1, further comprising:

collecting fingerprint information when the multiple adjustment operations are performed;

determining whether the multiple adjustment operations are from a same user according to the fingerprint information; and in response to determining that the multiple adjustment operations are from the same user, performing calculation on the multiple groups of adjustment parameters according to a preset algorithm to obtain the average color temperature difference.

5. A device for adjusting color temperature of a screen, comprising a non-transitory computer-readable medium comprising computer-executable instructions stored thereon and an instruction execution system which is configured by the instructions to implement at least one of:

a first obtaining module, configured to obtain multiple groups of adjustment parameters corresponding to multiple adjustment operations on initial color temperature of a screen, comprising: an obtaining unit, configured to obtain target color temperature and adjustment ambient parameters corresponding to each adjustment operation on the initial color temperature of the screen; a calculating unit, configured to calculate the first color temperature difference of the target color temperature minus the initial color temperature;

a second obtaining module, configured to perform calculation on the multiple groups of adjustment parameters according to a preset algorithm, to obtain an average color temperature difference;

a calculating module, configured to calculate preference color temperature based on the initial color temperature and the average color temperature difference, comprising: a third obtaining unit, configured to perform calculation on the first color temperature difference and the adjustment ambient parameters of each color temperature adjustment s according to a preset neural network algorithm, to obtain a second color temperature difference of each color temperature adjustment a fourth obtaining unit, configured to average multiple second color temperature differences corresponding to the multiple adjustment operations on the initial color temperature of the screen, to obtain the average color temperature difference; and a setting module, configured to set the color temperature of the screen according to the preference color temperature;

wherein the adjustment ambient parameters comprise a combination of ambient color temperature, illumination, and time; and the third obtaining unit is configured to: obtain weights corresponding to different adjustment ambient parameters, and perform calculation on the first color temperature difference, the adjustment ambient parameters and corresponding weights of each color temperature adjustment according to the preset neural network algorithm, to obtain the second color temperature difference of each color temperature adjustment.

6. The device according to claim 5, wherein the second obtaining module is configured to:

average multiple first color temperature differences corresponding to the multiple adjustment operations on the initial color temperature of the screen, to obtain the average color temperature difference.

7. The device according to claim 5, wherein the calculating module is configured to:

add the average color temperature difference to the initial color temperature to obtain the preference color temperature.

8. The device according to claim 5, wherein the second obtaining module is configured to:

collect fingerprint information when the multiple adjustment operations are performed;

determine whether the multiple adjustment operations are from a same user according to the fingerprint information; and in response to determining that the multiple adjustment operations are from the same user, perform calculation on the multiple groups of adjustment parameters according to a preset algorithm to obtain the average color temperature difference.

9. An electronic device, comprising a housing, a processor, a memory, a circuit board, a power supply circuit and a screen, wherein, the circuit board is arranged inside a space enclosed by the housing;

the processor and the memory are disposed on the circuit board;

the power supply circuit is configured to provide power for respective circuits or components of the electronic device;

the memory is configured to store executable program codes;

the processor is configured to run a program corresponding to the executable program codes by reading the executable program codes stored in the memory, to perform:

obtaining multiple groups of adjustment parameters corresponding to multiple adjustment operations on initial color temperature of the screen, comprising: obtaining target color temperature and adjustment ambient parameters corresponding to each adjustment operation on the initial color temperature of the screen, and calculating a first color temperature difference of the target color temperature minus the initial color temperature;

performing calculation on the multiple groups of adjustment parameters according to a preset algorithm, to obtain an average color temperature difference, comprising: performing calculation on the first color temperature difference and the adjustment ambient parameters of each color temperature adjustment according to a preset neural network algorithm, to obtain a second color temperature difference of each color temperature adjustment and averaging multiple second color temperature differences corresponding to the multiple adjustment operations on the initial color temperature of the screen, to obtain the average color temperature difference; and calculating preference color temperature based on the initial color temperature and the average color temperature difference, and setting the color temperature of the screen according to the preference color temperature;

wherein the adjustment ambient parameters comprise a combination of ambient color temperature, illumination, and time, and before obtaining the second color temperature difference of each color temperature adjustment, the processor is configured to perform:

obtaining weights corresponding to different adjustment ambient parameters, and performing calculation on the first color temperature difference, the adjustment ambient parameters and corresponding weights of each color temperature adjustment according to the preset neural network algorithm, to obtain the second color temperature difference of each color temperature adjustment.

10. The electronic device according to claim 9, wherein the electronic device is a mobile terminal.

* * * * *